United States Patent [19]

Miller

[11] Patent Number: 4,661,029

[45] Date of Patent: Apr. 28, 1987

[54] QUICK DISCONNECT COLLET ASSEMBLY

[75] Inventor: Charles L. Miller, Antwerp, Ohio

[73] Assignee: Dana Corporation, Toledo, Ohio

[21] Appl. No.: 812,589

[22] Filed: Dec. 23, 1985

[51] Int. Cl.$^4$ ............................................ B23B 31/26
[52] U.S. Cl. .................................... 409/233; 279/50; 279/53; 285/391
[58] Field of Search .................. 279/41 R, 41 A, 42, 279/43, 44, 45, 46, 47, 48, 49, 50, 51, 52, 53, 54, 55, 56; 409/233; 285/391, 396, 402

[56] References Cited

U.S. PATENT DOCUMENTS

| | | | |
|---|---|---|---|
| 290,663 | 12/1883 | Blue | 285/391 X |
| 1,850,297 | 3/1932 | Volz | 279/52 |
| 2,828,662 | 4/1958 | Antal | 285/35 |
| 3,118,345 | 1/1964 | Bullard, III et al. | 409/233 |
| 3,248,129 | 4/1966 | Brown | 285/396 X |
| 3,254,457 | 6/1966 | Daugherty | 409/233 |
| 3,442,536 | 5/1969 | Fowler | 285/391 X |
| 4,306,743 | 12/1981 | Hinshaw et al. | 285/396 X |
| 4,406,485 | 9/1983 | Giebeler | 285/391 |

Primary Examiner—Gil Weidenfeld
Assistant Examiner—Glenn L. Webb
Attorney, Agent, or Firm—Frank B. McDonald

[57] ABSTRACT

A quick disconnect coupling mechanism for a collet and collet tube facilitates connection and disconnection of the two members to and from one another. In a preferred form, the collet is provided with circumferentially spaced external threaded portions which are separated by unthreaded portions. The collet tube is provided with internally threaded, circumferentially spaced mating threaded portions which are separated by unthreaded portions. The collet tube can be quickly slipped over the collet, and located at a predetermined axial position thereon, and the two components can be rotated relative to one another to cause the threads to be moved into engagement with each other. The invention provides an indicator system for providing initial alignment of the collet tube with the collet. In a independently limits axial movement of the members relative to one another beyond a preset torque limit.

10 Claims, 3 Drawing Figures

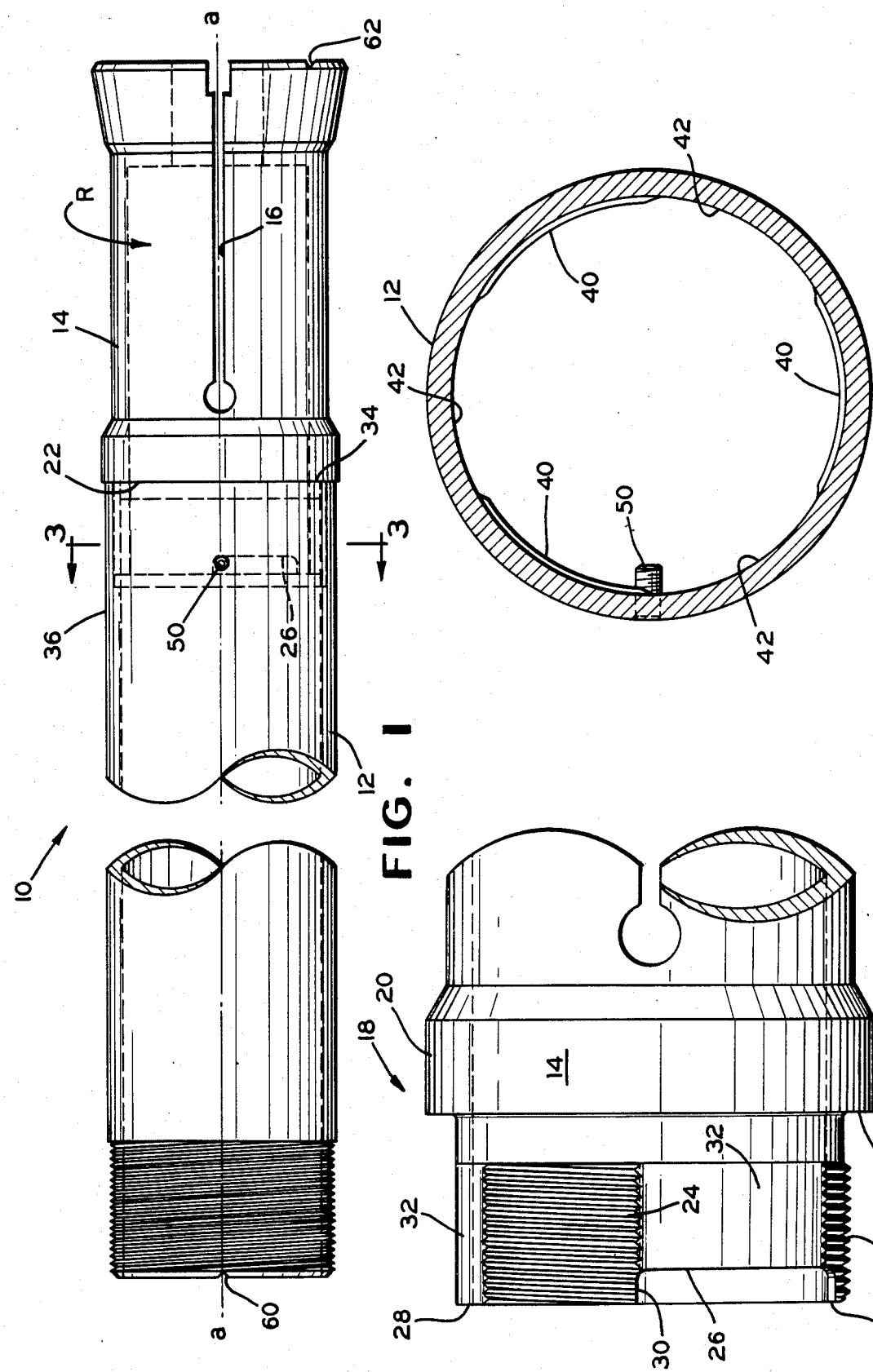

4,661,029

QUICK DISCONNECT COLLET ASSEMBLY

BACKGROUND OF THE INVENTION

This invention relates to apparatus designed to facilitate the rapid connection and disconnection of a pair of threaded members. More particularly, this invention relates to apparatus for selectively making quick connection and disconnection of collet and collet tube parts of a work spindle at an industrial machine station.

Although rapid strides have been made in the machining industry over the past decade, coupling systems utilized for affixing collet tubes to collets have essentially remained unchanged, notwithstanding the fact that multiple spindle machining apparatus has become commonplace. The result has been that changeover times required to change collet tubes on respective collet members have become inordinate, sometimes involving as much as eight hours, or a complete shift, to make a changeover.

Existing quick disconnect systems of the prior art, on the other hand, do not lend themselves appropriately to collet and collet tube systems. More particularly, the operating environment of collet and collet tube assemblies requires that care be taken to insure that mating threads between collet tube and collet members are not stripped by virtue of overtorquing. In addition, initial alignment of a quick disconnect collet tube with respect to a supporting collet would be cumbersome and difficult to achieve without special provisions tailored to the specific environment.

SUMMARY OF THE INVENTION

The invention disclosed herewith provides an apparatus for enabling a collet tube to be quickly slipped over a collet, and to be rotated a fraction of a turn for engaging cooperating threaded portions between the members. In a preferred form, the collet contains circumferentially spaced external threaded portions separated by uniformly spaced unthreaded portions disposed for receiving a collet tube having mating internally threaded portions uniformly spaced by mating unthreaded portions. The tube and collet have mating radially abutting surfaces for limiting axial movement of the tube relative to the collet. Thus, the tube may be slipped over the collet and located to a predetermined axial position relative thereto, then rotated in one direction to cause the mating threads to engage.

In a preferred form, the collet and collet tube both contain visual indicator markings to establish initial alignment of the tube relative to the collet. In addition, a positive rotational stop system provides an axial stop limit separate and apart from the noted radially disposed mating surfaces of the two members for independently limiting axial movement relative to one another beyond a preset limit. In a preferred form, the stop system provides a circumferentially directed arresting force against a stop pin fixed to the tube for arresting rotational movement of the tube about the collet upon the achievement of a predetermined torque limit.

BRIEF DESCRIPTION OF THE DRAWINGS

FIG. 1 is a partially fragmented elevation of a preferred embodiment of the quick disconnect collet and collet tube assembly of the present invention;

FIG. 2 is a fragmentary view of a portion of the collet only, and

FIG. 3 is a cross sectional view of the collet tube only, as viewed along lines 3—3 of FIG. 1.

DETAILED DESCRIPTION OF A PREFERRED EMBODIMENT

Referring initially to FIG. 1, a collet assembly 10 is shown which incorporates a preferred embodiment of the quick disconnect apparatus of the present invention. The assembly 10 includes a pair of coupled elongated members, defining a collet tube 12 secured to a collet 14 which is tubular as is typical in this art. A slot 16 renders the collet 14 partially collapsible for easy insertion into a rotary work spindle (not shown). The mating end 18 of the collet is more particularly shown in FIG. 2.

Thus referring now to FIG. 2, the collet 14 includes a flange 20 which defines a shoulder 22 for providing an abutting radially oriented surface for receiving the collet tube 12, more particularly detailed hereinafter. The collet 14 includes a set of three circumferentially extending, externally threaded portions 24 which are interspaced uniformly by a like plurality of unthreaded external portions 32 about the collet 14. An arcuate slotted portion 26 extends partially circumferentially along the extremity 28 of the mating end 18 of the collet 14. The slotted portion 26 includes a stop limit 30 which is effective to limit relative rotation of the collet tube 12 as will be described hereinbelow.

Referring now to FIG. 3, the collet tube 12 is shown in greater detail. A set of three circumferentially extending, internally threaded portions 40 are disposed within the tube 12 for mating with the corresponding externally threaded portions 24 on the collet 14. Similarly, a set of three circumferentially oriented alternately spaced unthreaded portions 42 are positioned in the tube 12. It will be appreciated that the initial insertion of the tube over the collet will require extension of the internally threaded portion of the tube over the corresponding unthreaded portions of the collet. Upon axial insertion to a predetermined limit, the tube is rotated against the intended direction of rotation "R" of the collet, as shown in FIG. 1. Thus, subsequent rotation of the collet tube under load in the direction "R" will tend to tighten, rather than loosen, the collet tube on the collet, as will be appreciated by those skilled in the art.

For purposes of proper securement of the tube 12 on the collet, the tube is inserted over the collet until the extremity 34 of the tube abuts the shoulder 22 of the flange 20 of the collet. To the extent that the internal threaded portions 40 of the tube 12 are normally hidden from view and are otherwise not apparent during attachment of the tube to the collet, a set of alignment notches, notch 60 on tube 12 and notch 62 on the collet 14, are aligned with respect to one another so as to lie on a line parallel to the axis of the collet upon proper orientation of the collet tube and collet for initial insertion. The notches are thus disposed to provide that the internally threaded portions 40 of the tube 12 will pass directly over the unthreaded external portions 32 of the collet, and thus avoid any unintended interference during axial passage of the mating end 36 of the tube 12 over the mating end 18 of the collet. Upon abutment of the tube extremity 34 with the collet shoulder 22, the tube is rotated against the intended rotation "R" as noted. A radially inwardly extending projection, defined by a stop pin 50 (FIG. 3), is positioned on the tube 12 to contact the stop limit 30 of the slotted portion 26 of the collet at a predetermined torque limit between the tube and collet surfaces 34 and 22. In the preferred embodiment, the torque limit falls within a range of 75 to 100 foot/pounds, and in the preferred embodiment is approximately 80 foot/pounds. The stop limit 30 will be effective to provide a circumferentially directed arresting force against the stop pin 50, the latter being strategically located to avoid movement of the tube rotationally about the collet beyond a desirable torque limit. The stop pin 50 and the associated stop limit 30 have been found effective to avoid distortion of the mated threaded portions of collet and tube resulting from overtorquing the two members together.

In the preferred embodiment of the present invention, the externally threaded portions 24 of the collet are separated by unthreaded portions 32 as noted. The portions 32 are preferably formed at a radius which is slightly less than the radial distance to the root of the threads of the externally threaded portions. In addition, the internally threaded circumferentially spaced portions 40 of the tube are separated by unthreaded portions 42 as also noted; wherein the latter are formed at a radius slightly greater than the root of the internal threads. The result is that extra clearance is provided, wherein the tube can be quickly slipped over the collet, and located at a predetermined axial position thereon, and the two components can be rotated with respect to one another to cause the threads to be moved into engagement with each other. For a collet of 1⅜ inch diameter, a satisfactory amount of clearance was provided by an approximately 0.005 inch radial dimension difference relative to the root radius in both instances.

Finally, and also in a preferred form, the stop pin 50 and alignment notch 60 are both positioned on the collet tube 12 so as to lie along a common line parallel to the axis a—a of the collet assembly 10, the latter defining the respective coaxial axes of both the collet and collet tube members.

Although only one preferred embodiment has been shown and described herein, the following claims are envisioned to cover numerous alternative embodiments which will fall within the spirit and scope thereof.

What is claimed is:

1. In an apparatus for coupling first and second coaxial elongated members, said first member comprising a tube, said apparatus disposed for selectively axially securing said tube to said second member and rotationlly securing said members for loaded coupled movement of said members in one rotational direction, said first and second members having radially disposed mating surfaces for limiting axial movement of said tube relative to said second member, said second member having circumferentially spaced externally threaded portions separated by uniformly spaced unthreaded portions, said tube having mating circumferentially spaced internally threaded portions intermediately spaced by mating unthreaded portions, whereby said tube may be slipped over said second member and located thereover to a predetermined axial position relative thereto, and wherein said tube may then be rotated in said one direction of rotation to cause said mating threads to engage; an improvement comprising: positive rotational stop means separate and apart from said axial mating surfaces for independently limiting axial movement of said members relative to one another beyond a preset limit, said stop means providing a circumferentially directed arresting force against movement of said tube relative to said second member, wherein said positive rotational stop means comprises a radially inwardly extending projection fixed to one end of said tube, and an arcuate circumferentially extending slotted portion in an extremity of a mating end of said second member disposed for receiving said projection, said slotted portion extending orthogonally with respect to said axes of said first and second members and including a stop limit disposed for imparting said circumferentially directed arresting force against said projection upon contact of said projection with said stop limit, whereby said projection and said stop limit become engaged at said preset limit upon relative rotation of first and second members.

2. The apparatus of claim 1 further comprising visual locator means for establishing initial alignment of said tube relative to said second member.

3. The apparatus of claim 1 wherein said visual locator means comprises a pair of alignment notches, one of said notches being positioned on said first member, the other of said notches being positioned on said second member.

4. The apparatus of claim 2 wherein each said first amd second member includes a set of three mating circumferentially spaced threaded portions separated by three uniformly spaced unthreaded portions.

5. The apparatus of claim 3 wherein said projection comprises a stop pin which is positioned on said tube to engage said stop limit after said mating surfaces have contacted one another, and prior to a preset torque limit between said radially disposed mating surfaces, whereby distortion of said mating threaded portions may be eliminated.

6. The apparatus of claim 4 wherein said unthreaded portions of said second member are formed at a radius slightly less than the radial distance to the root of the threads of said externally threaded portions thereon, while said unthreaded portions of said first member are formed at a radius slightly greater than the root of the internal threads of said first member.

7. The apparatus of claim 5 wherein said first member is a collet tube, and wherein said second member is a collet.

8. The apparatus of claim 6 wherein said collet defines a tubular elongated member disposed for threadably supporting said collet tube.

9. The apparatus of claim 7 wherein said alignment notch and said stop pin are both positioned on an imaginary line parallel to the axis of said collet tube.

10. The apparatus of claim 8 wherein said torque limit is in the range of 75–100 foot/pounds between said radially disposed mating surfaces.

* * * * *